United States Patent [19]

Messina et al.

[11] Patent Number: 5,713,596
[45] Date of Patent: Feb. 3, 1998

[54] LIQUID PROPELLANT INFLATION APPARATUS FOR DEPLOYING AN INFLATABLE MEMBER

[75] Inventors: Neale Arthur Messina, Philadelphia, Pa.; Larry Stephan Ingram, Lawrenceville, N.J.

[73] Assignee: Lockheed Martin Corporation, Bethesda, Md.

[21] Appl. No.: 674,063

[22] Filed: Jul. 1, 1996

[51] Int. Cl.$^6$ ................................................ B60R 21/26
[52] U.S. Cl. ................................................ 280/737; 280/741
[58] Field of Search ............................. 280/736, 737, 280/741

[56] References Cited

U.S. PATENT DOCUMENTS

| | | | |
|---|---|---|---|
| 5,060,973 | 10/1991 | Giovanetti | 280/736 |
| 5,348,344 | 9/1994 | Blumenthal et al. | 280/737 |
| 5,487,561 | 1/1996 | Mandzy et al. | 280/741 |
| 5,582,806 | 12/1996 | Skanberg et al. | 280/741 |
| 5,639,117 | 6/1997 | Mandzy et al. | 280/741 |

*Primary Examiner*—Kenneth R. Rice
*Attorney, Agent, or Firm*—Finnegan, Henderson, Farabow, Garrett & Dunner, L.L.P.

[57] ABSTRACT

An apparatus for deploying an inflatable member, such as a safety bag in a motor vehicle, includes a hydraulic actuator for amplifying the fluid pressure in a combustion chamber, initially generated by a pyrotechnic initiator, and applying the amplified fluid pressure to continuously pressurize a liquid propellant reservoir to magnitudes exceeding the combustion chamber fluid pressure. All of the liquid propellant in the reservoir is then rapidly injected as a continuous stream into the combustion chamber for ignition and sustained combustion, thereby generating the volume of combustion gases necessary to fully inflate the safety bag.

13 Claims, 1 Drawing Sheet

LIQUID PROPELLANT INFLATION APPARATUS FOR DEPLOYING AN INFLATABLE MEMBER

BACKGROUND OF THE INVENTION

1. Field of the Invention

The present invention relates to an apparatus and method for inflating an inflatable member. More particularly, the present invention relates an apparatus and method for deploying a vehicle occupant safety bag.

2. Description of Related Art

"Passive" restraint apparatus, which require no action by a vehicle occupant to make operative, as contrasted to "active" restraint apparatus requiring a conscious effort by an occupant to become operative (such as conventional seat belts), are now commonly being included as standard equipment in motor vehicles due to government agency, insurance industry, and consumer demands. Experience and testing have shown that the most effective passive occupant restraint approach is to abruptly (in a matter of milliseconds) inflate a safety bag automatically in response to a high impact collision. The inflated safety bag cushions the occupant(s) from the effects of the collision for an interval sufficient to prevent serious injury.

The mechanics for timely inflating a safety bag are basically of two types. One type involves storing a volume of highly compressed gas, such as argon, in a suitable reservoir. On impact, the gas is released to inflate the safety bag. However, this approach has numerous disadvantages. The bulk and weight of the components for storing the requisite large volume of compressed gas make it difficult and expensive to package the safety apparatus in the steering column, dashboard, and doors of motor vehicles. Further, because the gas is compressed at a high pressure, storage integrity over a long time period of widely varying ambient conditions is tenuous at best.

As a consequence, safety bag inflation through the release of compressed gas has largely been supplanted by the use of ignitable propellants capable of rapidly generating large volumes of gas by exothermic reaction. Propellants are normally in a solid or granular form comprised of low energy compositions, such as an alkali metal azide, cupric oxide, boron nitrate, etc. A significant drawback to solid propellants is that they typically generate gases containing toxic by-products and particulate matter. As a consequence, the safety bag inflating gases are typically filtered to remove the toxic by-products and also to catch combusting particulate matter capable of burning holes in the safety bag. These filters increase the size, weight, and cost of a passive restraint apparatus.

Alternatively, propellants for safety bag inflation may be in a liquid form, as disclosed in U.S. Pat. No. 5,060,973, issued to Giovanetti, the disclosure of which is incorporated herein by reference. A particularly important consideration in liquid propellant inflating devices is controlled combustion of all of the liquid propellant to achieve effective and timely deployment of the safety bag.

SUMMARY OF THE INVENTION

The general objective of the present invention is to provide an improved apparatus for deploying an inflatable member.

Another objective of the invention is to provide a compact apparatus, economical in construction and efficient in operation, for inflating an occupant safety bag in a motor vehicle, using gases generated during controlled combustion of a liquid propellent.

An additional objective of the invention is to provide an inflation apparatus of the above character, wherein the a volume of liquid propellent can be conveniently varied in accordance with the size of the safety bag to be inflated.

A further object is to provide a safety bag inflation apparatus that overcomes one or more of the disadvantages and shortcomings of the related art.

To achieve these and other objectives in accordance with the invention, as embodied and broadly described herein, the apparatus of the invention comprises a housing including a vent passage in fluid flow communication with an inflatable member to be deployed. An initiator is positioned in the housing to generate, upon activation, high temperature gas that raises the fluid pressure in an internal combustion chamber. The housing also contains a liquid propellant reservoir in communication with the combustion chamber through a fluid passage and a hydraulic actuator acting in response to the fluid pressure in the combustion chamber to continuously pressurize the liquid propellant in the reservoir to higher magnitudes than the fluid pressure in the combustion chamber. As a result, the liquid propellant is injected from the reservoir into the combustion chamber through the fluid passage for ignition and combustion to generate combustion gases that flow through the vent passage in sufficient quantity to fully deploy the inflatable member.

Additional features, objects, and advantages of the invention will be set forth in part in the description which follows, and in part will be evident from the description, or may be learned by practice of the invention. The objectives and advantages of the present invention will be realized and obtained by the apparatus particularly pointed out in the following written description and the appended claims, as well as in the accompanying drawing.

It is to be understood that both the foregoing general description and the following detailed description are exemplary only and are not restrictive of the invention, as claimed.

BRIEF DESCRIPTION OF THE DRAWING

The accompanying drawing, which is incorporated in and constitutes a part of this specification, illustrates an embodiment of the invention and, together with the description, serves to explain the principles of the invention. The sole figure of the drawing is a cross sectional view of a preferred embodiment of a safety bag inflation apparatus according to the invention.

DETAILED DESCRIPTION

Figure 1:
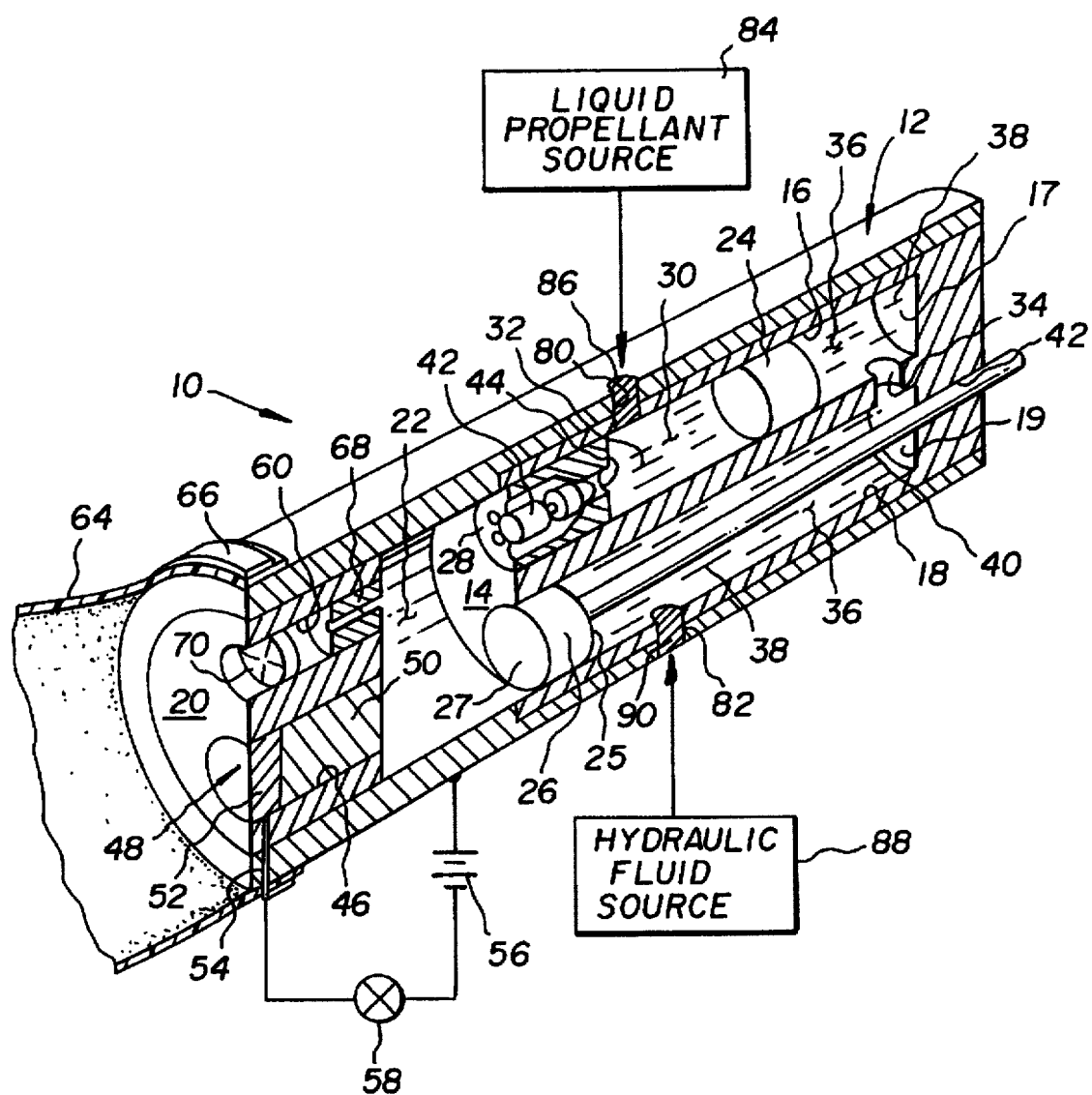

Reference will now be made in detail to the present preferred embodiment of the invention, an example of which is illustrated in the accompanying drawing.

In accordance with the present invention, an apparatus, generally indicated at 10, is illustrated in its application for deploying a inflatable member, such as an occupant restraint safety bag in a motor vehicle. The apparatus 10 includes a cylindrical housing, generally indicated at 12, in which an insert 14 is received through one housing open end in fluid sealed relation. Insert 14 is machined to provide a pair of axially elongated, blind bores that serve as parallel, coextensive cylinders 16 and 18. A plug 20 is fitted in the other housing open end in fluid sealed relation to a position in spaced relation with insert 14, such as to provide an internal combustion chamber 22 therebetween. The housing 12, insert 14, and plug 20 are preferably metallic, such as steel or aluminum, to withstand the high internal fluid pressures generated during safety bag deployment.

A separator piston 24 is slidingly received in cylinder 16, and a piston 26 is slidingly received in cylinder 18. The open end of cylinder 16 is sealed off by a plug 28. The space in cylinder 16 between this plug 22 and piston 24 provides a reservoir 30 containing a liquid propellant 32. The liquid propellant may be a HAN-based liquid propellant bearing the U.S. Army designation "XM 46".

Alternatively, the liquid propellant 32 may be a hydroxyl ammonium nitrate-based liquid monopropellant, as disclosed in the cited Giovanetti patent. A typical liquid propellant formulation may be, by mass, approximately 60% hydroxyl ammonium nitrate as an oxidizer, 20% triethanol ammonium nitrate as a fuel, and 20% water as a solvent.

A transverse port 34, machined in insert 14, provides fluid communication between cylinders 16 and 18 at a location adjacent to their closed ends 17 and 19, respectively. The segments of cylinders 16 and 18 between pistons 24 and 26, that are in fluid communication via port 34, provide a folded reservoir 36 containing a hydraulic fluid 38 in liquid form.

Affixed to piston 26 is an elongated piston rod 40 that extends coaxially through cylinder 18 and exits through a close-fitting bore 42 drilled through the closed end 19 of this cylinder. The presence of piston rod 40 results in the face 25 of piston 26 confronting hydraulic fluid reservoir 36 having a smaller surface area than the piston face 27 confronting combustion chamber 22. The significance of this surface area differential will be explained in detail below.

Plug 28, fitted in the open end of cylinder 16, incorporates a one-way valve 42 that permits liquid propellant flow from reservoir 30 into combustion chamber 22 through a fluid passage 44, while preventing return fluid flow back into reservoir 30 in the face of high fluid pressures in the combustion chamber. Thus, one-way valve 42 may be a spring-loaded ball valve or check valve of conventional construction.

Housing end plug 20 includes a through-bore 46 for accepting an initiator, generally indicated at 48, for pressurizing the combustion chamber 22 leading to ignition and combustion of liquid propellent 32. Preferably, initiator 48 includes a pyrotechnic material 50 and an ignitor 52. The pyrotechnic material 50 may be in liquid form, but preferably is a solid, such as boron potassium nitrate or zirconium potassium fluorochloride or smokeless power. Ignitor 52 may be of any type capable of igniting the pyrotechnic material 50, such as those materials disclosed in the cited Giovanetti patent.

In the disclosed embodiment, ignitor 52 is exposed to an electrode 54 lead out through a hermetically sealed, radial hole drilled through housing end plug 20 and the wall of housing 12 for connection to one side of a vehicle battery 56 through a normally opened, impact sensitive, inertial switch 58. The other side of the battery is connected to housing 12, such that a firing circuit is completed upon closure of switch 58.

Housing end plug 20 also includes an axial bore that serves as an vent passage 60 providing fluid communication between combustion chamber 22 and an inflatable member, such as a safety bag, fragmentally illustrated at 64 in FIG. 1. The mouth of the safety bag is sealed about the vented end of housing 12 by suitable clamp 66. To assist in controlling the rate of safety bag inflation, an orifice element 68 is incorporated in the vent passage 60. In addition, the vent passage incorporates a burst disk 70 designed to rupture when the fluid pressure in combustion chamber 22 reaches a predetermined level, for example, 1,000 psi, such that safety bag inflation is delayed until an appropriate quantity of liquid repellant is burned in the combustion chamber. The burst disk 80 is preferably metallic, such as brass or aluminum.

In the event a vehicle equipped with apparatus 10 of the present invention is involved in a high impact accident, the switch 58 closes to complete the firing circuit and effect activation of initiator 48. Ignitor 52 initiates the pyrotechnic material 50 to pressurize combustion chamber 22. The rising fluid pressure in the combustion chamber drives piston 26 toward the closed end 19 of cylinder 18, resulting in hydraulic fluid 38 being pumped through port 34 into cylinder 16 behind piston 24. Because of the surface area differential of the faces 25 and 27 of piston 26, the hydraulic fluid in reservoir 36 is continuously pressurized to a fluid pressure in excess of the fluid pressure in combustion chamber 22. Thus, the hydraulic fluid pressure exerted on piston 24 is effective in pressurizing the liquid propellant 32 in reservoir 30 to a fluid pressure in excess of the fluid pressure in combustion chamber 22.

Consequently, one-way valve 42 opens to permit the pumped flow of liquid propellant into the combustion chamber through fluid passage 44. The liquid propellant entering the combustion chamber is immediately ignited by the hot combustion gases generated by the initiated pyrotechnic material 50. With combustion of the liquid propellant now initiated, the fluid pressure in the combustion chamber rapidly rises to the designed burst pressure of burst disk 70. When the burst disk ruptures, the combustion gases flow through orifice member 68 and vent passage 60 to begin inflation of safety bag 64.

By virtue of the differential face surface area of piston 26, the liquid propellant in reservoir 30 continues to be pressurized to magnitudes greater than the fluid pressures in the combustion chamber 22 throughout the inflation process, and injection of the full charge of liquid propellant 32 from reservoir 30 into the combustion chamber for ignition and complete combustion is ensured. Full inflation of the safety bag is rapidly achieved, in a few microseconds, to prevent injury to the vehicle occupant.

While housing 12 is illustrated as being cylindrical, it will be appreciated that it may take a variety of shapes, such as rectangular, depending upon the site of installation in the vehicle, i.e., steering column, dashboard, or door. If space limitations require it, piston rod 40 may be readily designed to progressively crumble as its free end is driven out of the housing end during safety bag inflation.

Although FIG. 1 illustrates the mouth of safety bag 64 being sealed about one end of the housing 12, the safety bag may be installed to the inflator housing in a variety of ways depending upon the housing configuration. For example, an external manifold (not shown) may be mounted to a side of the housing to direct the inflation gases from the housing vent passage into the safety bag whose mouth is sealed about the manifold.

As an important feature of the present invention, inflation apparatus 10 may be readily adapted to inflate a safety bag of a wide range of sizes, as dictated by the site of installation in a motor vehicle. To this end, the inflation apparatus may be fully assembled in the factory, except for the installation of the safety bag 64 and the chargings of reservoirs 30 and 36 with liquid propellant 32 and hydraulic fluid 38, respectively. To accommodate subsequent fluid chargings, a radial port 80 is drilled through the housing wall into reservoir 30 at a location adjacent to cylinder plug 28. A second fill port 82 is drilled through the housing wall into reservoir 36. Then, when the size of the safety bag the inflation apparatus is to inflate has been determined, the appropriate volume of liquid propellant 32 is pumped from a source 84 into reservoir 30 through port 80. Piston 24 slides rearwardly to a charged position, expanding the reservoir volume to accommodate the metered charge of liquid propellant 32 pumped by source 80 into reservoir 30. Port 80 is then sealed with a plug 86. Hydraulic fluid 38 is then pumped from a source 88 through port 82 to completely fill reservoir 36. Port 82 is then sealed with a plug 90. It is seen that the position of piston 24 readily adjusts to the volume of liquid propellant charge pumped into reservoir 30, and thus the inflation apparatus 10 is universally adaptable to fully inflate any one of a wide range of safety bag sizes determined by the quantity of the liquid propellant charge that has been pumped into reservoir 30.

While the inflation apparatus of the present invention has been described in this application to inflating a passenger restraint safety bag installed in a motor vehicle, this description should not be taken in a limiting sense. That is, the inflation apparatus of the present invention may be used to rapidly deploy other types of inflatable members for different purposes.

Other embodiments of the invention will be apparent to those skilled in the art from consideration of the specification and from practice of the invention disclosed herein. It is intended that the present invention cover the modifications and variations of this invention, provided they come within the scope of the appended claims and their equivalents.

What is claimed is:

1. Apparatus for deploying an inflatable member, comprising:
   a housing including a vent passage in fluid flow communication with the inflatable member installed to the housing;
   a combustion chamber in the housing;
   an initiator positioned in the housing to generate, upon activation, high temperature gas increasing fluid pressure in the combustion chamber;
   a reservoir in the housing containing a liquid propellant;
   a fluid passage connecting the liquid propellant reservoir to the combustion chamber; and
   a hydraulic actuator responsive to the fluid pressure in the combustion chamber for continuously pressurizing the liquid propellant in the reservoir to higher magnitudes than the fluid pressure in the combustion chamber, whereby to achieve sustained injection of the liquid propellant into the combustion chamber from the reservoir for ignition and combustion to generate combustion gases that flow through the vent passage to deploy the inflatable member.

2. The apparatus defined in claim 1, further including a one-way valve positioned in the fluid passage.

3. The apparatus defined in claim 1, further including a frangible member positioned to block the vent passage until the fluid pressure in the combustion chamber exceeds a threshold level.

4. The apparatus defined in claim 3, further comprising an orifice element disposed in the vent opening.

5. The apparatus defined in claim 1, wherein the hydraulic actuator includes a hydraulic fluid reservoir in fluid pressure-coupled relation with the liquid propellant reservoir and a hydraulic piston disposed between the combustion chamber and the hydraulic fluid reservoir.

6. The apparatus defined in claim 5, wherein the hydraulic piston includes a first face exposed to the fluid pressure in the combustion chamber and a second face confronting the hydraulic fluid reservoir, the first face having a greater surface area than the second face.

7. The apparatus defined in claim 6, wherein the hydraulic actuator further includes a slidable piston separating the liquid propellant and the hydraulic fluid reservoirs to couple the fluid pressure of the hydraulic fluid to the liquid propellant.

8. An apparatus for deploying an inflatable member, comprising:
   a housing including a vent passage in fluid flow communication with the inflatable member installed to the housing;
   a combustion chamber in the housing;
   an initiator positioned in the housing to generate, upon activation, high temperature gas increasing fluid pressure in the combustion chamber;
   first and second cylinders positioned in parallel relation within the housing and having respective first and second open ends facing the combustion chamber and respective first and second closed ends;
   an opening adjacent the first and second closed ends connecting the first and second cylinders in fluid communication;
   a closure in the first cylinder open end and including a fluid passage;
   a first piston slidingly received in the first cylinder to cooperate with the closure in defining a first reservoir;
   liquid propellant contained in the first reservoir;
   a second piston slidingly received in the second cylinder open end to define a second reservoir between the first and second pistons; and
   hydraulic fluid filling the second reservoir,
      wherein the second piston communicates a force proportional to the fluid pressure in the combustion chamber to the first piston through the hydraulic fluid, and
      wherein one of the first and second pistons has a differential surface area of opposed faces effective to continuously pressurize the liquid propellant in the first reservoir to a higher fluid pressure than the fluid pressure in the combustion chamber,
      whereby to achieve sustained injection of the liquid propellant from the first reservoir into the combustion chamber through the fluid passage for ignition and generation of combustion gases that flow through the vent passage to deploy the inflatable member.

9. The apparatus defined in claim 8, wherein the housing further includes a first port through which a metered charge of the liquid propellant may be introduced into the first reservoir, the first pistons sliding in the first cylinder to a charged position establishing a volume of the first reservoir sufficient to accept the liquid propellant charge, a second port through which the hydraulic fluid is introduced to fill the second reservoir defined between the second piston and the first piston in the charged position, and plugs sealing the first and second ports.

10. The apparatus defined in claim 8, further including a one-way valve positioned in the fluid passage.

11. The apparatus defined in claim 10, further including a frangible member positioned to block the vent passage until the fluid pressure in the combustion chamber exceeds a threshold level.

12. The apparatus defined in claim 11, further comprising an orifice element disposed in the vent opening.

13. The apparatus defined in claim 8, wherein the second piston includes a first face confronting the combustion chamber, a second face confronting the second reservoir, and a piston rod fixed to the second face for extension through the second cylinder to a free end sliding received through an opening in the second cylinder closed end, the piston decreasing a surface area of the second face to a value less than a surface area of the first face, such that the second piston has the differential surface area of opposed faces.

* * * * *